United States Patent
Kitashima et al.

(10) Patent No.: US 11,413,705 B2
(45) Date of Patent: Aug. 16, 2022

(54) LASER BONDING METHOD AND LASER BONDING DEVICE

(71) Applicant: NICHIRIN CO., LTD., Hyogo (JP)

(72) Inventors: Akira Kitashima, Himeji (JP); Takao Maeda, Himeji (JP)

(73) Assignee: NICHIRIN CO., LTD., Hyogo (JP)

( * ) Notice: Subject to any disclaimer, the term of this patent is extended or adjusted under 35 U.S.C. 154(b) by 0 days.

(21) Appl. No.: 17/433,804

(22) PCT Filed: Feb. 21, 2020

(86) PCT No.: PCT/JP2020/007199
§ 371 (c)(1),
(2) Date: Aug. 25, 2021

(87) PCT Pub. No.: WO2020/175400
PCT Pub. Date: Sep. 3, 2020

(65) Prior Publication Data
US 2022/0040794 A1    Feb. 10, 2022

(30) Foreign Application Priority Data

Feb. 25, 2019 (JP) .............................. JP2019-031455

(51) Int. Cl.
*B23K 26/282* (2014.01)
*F16L 47/02* (2006.01)
(Continued)

(52) U.S. Cl.
CPC ........ *B23K 26/282* (2015.10); *B23K 26/0869* (2013.01); *B23K 26/244* (2015.10);
(Continued)

(58) Field of Classification Search
CPC ................ B23K 26/282; B23K 26/244; B23K 26/0869; B23K 37/0247; B23K 37/0276;
(Continued)

(56) References Cited

U.S. PATENT DOCUMENTS

2003/0141009 A1* 7/2003 Landherr ............ B29C 66/5221
                                                                156/158
2005/0167407 A1   8/2005 Chen et al.
(Continued)

FOREIGN PATENT DOCUMENTS

EP     1035259 A1    9/2000
JP     H09-52186 A   2/1997
(Continued)

OTHER PUBLICATIONS

International Search Report issued in International Application No. PCT/JP2020/007199, dated Apr. 14, 2020 (5 pages).
(Continued)

*Primary Examiner* — Dana Ross
*Assistant Examiner* — Kuangyue Chen
(74) *Attorney, Agent, or Firm* — Osha Bergman Watanabe & Burton LLP

(57) ABSTRACT

A resin pipe 30 and a resin member 31 are fixed to a setting portion 5 provided on the front side of a base 6, and a timing pulley 13 which is provided on the back side of the base 6 and to which a light emission unit 3 is attached is rotated. As a result, the light emission unit 3 applies laser light 20 to a junction 32 between the resin pipe 30 and the resin member 31 while revolving around the junction 32. This makes it easy to fuse and join the entire outer circumferential surface of the resin pipe 30 with the entire inner circumferential surface of the resin member 31, which are variously shaped and sized.

8 Claims, 5 Drawing Sheets

(51) Int. Cl.
*B23K 26/08* (2014.01)
*B23K 37/02* (2006.01)
*B23K 26/244* (2014.01)
*B23K 103/00* (2006.01)
*B23K 101/06* (2006.01)

(52) U.S. Cl.
CPC ...... *B23K 37/0247* (2013.01); *B23K 37/0276* (2013.01); *F16L 47/02* (2013.01); *B23K 2101/06* (2018.08); *B23K 2103/42* (2018.08)

(58) Field of Classification Search
CPC .. B23K 2103/42; B23K 2101/06; F16L 47/02
See application file for complete search history.

(56) References Cited

U.S. PATENT DOCUMENTS

2005/0251986 A1 11/2005 Katayama et al.
2020/0011457 A1* 1/2020 You ................... B29C 66/1222

FOREIGN PATENT DOCUMENTS

| JP | 09150283 A | * | 6/1997 | ........... B23K 26/103 |
|----|------------|---|--------|------------------------|
| JP | H09-150283 A | | 6/1997 | |
| JP | 2004-090628 A | | 3/2004 | |
| JP | 2004090628 A | * | 3/2004 | ......... B29C 65/1654 |
| JP | 2005-088585 A | | 4/2005 | |
| JP | 2006-334617 A | | 12/2006 | |
| JP | 2006334617 A | * | 12/2006 | |
| JP | 2017-149039 A | | 8/2017 | |
| WO | 1999/22081 A1 | | 5/1999 | |

OTHER PUBLICATIONS

Written Opinion issued in International Application No. PCT/JP2020/007199, dated Apr. 14, 2020 (3 pages).
Office Action issued in Japanese Application No. 2019-031455, dated Sep. 3, 2019 (8 pages).

\* cited by examiner

LASER BONDING METHOD AND LASER BONDING DEVICE

TECHNICAL FIELD

The present invention relates to a laser bonding method and a laser bonding device, by which the inner circumferential surface of a member made of a resin material is joined with the outer circumferential surface of a pipe made of a resin material.

BACKGROUND ART

Joining of resin members with each other by laser welding has been known. For example, when a pipe is joined with a joint, the pipe made of a resin member absorbing laser light is inserted into the joint made of a resin member transmitting laser light, and laser light is applied to the entire circumference of the junction between the pipe and the joint, with the result that these member are joined by laser welding.

According to a laser bonding method recited in Patent Literature 1, laser welding over the entire circumference of the junction is achieved in such a way that a cylindrical or concave direction changer having a reflecting surface on its inner surface is provided to surround a resin member, and laser light is reflected on the reflecting surface whose tilt angle has been adjusted.

CITATION LIST

Patent Literatures

[Patent Literature 1] Japanese Laid-Open Patent Publication No. 2005-088585

SUMMARY OF INVENTION

Technical Problem

The direction changer of Patent Literature 1 is disadvantageous in that the reflecting surface which is large enough to surround the junction and is shaped to reflect laser light to the junction must be provided on the inner surface. Manufacturing such a device requires a large amount of money. Furthermore, when a resin member whose size or shape prohibits the use of the laser welding by means of the direction changer is joined, a new direction changer must be manufactured and used. In this way, the above-described method lacks versatility in terms of joining of resin pipes and resin members with various shapes and sizes.

An object of the present invention is to provide a laser bonding method and a laser bonding device for joining a resin pipe with a resin member by applying laser light, by which resin pipes and resin members with various shapes and sizes can be easily joined.

Solution to Problem

A laser bonding method of joining a resin pipe with a resin member of the present invention, which is for joining an inner circumferential surface of a member made of a resin material transmitting laser light with an outer circumferential surface of a pipe made of a resin material absorbing laser light, comprises the steps of: fixing the pipe and the member to a setting portion provided on a front side of a base; and fusing and joining the entire outer circumferential surface of the pipe with the entire inner circumferential surface of the member by applying the laser light onto a junction between the pipe and the member fixed to the setting portion while causing a light emission unit to revolve around the junction, the light emission unit being configured to emit the laser light and attached to a pulley or a gear, the pulley or the gear being provided on a back side of the base, and the light emission unit revolving around the junction as the pulley or the gear is rotated.

The shape and size of each of the resin pipe and the resin member to be joined are determined in accordance with the radius of revolution of the light emission unit emitting the laser light. According to the arrangement above, resin pipes and resin members with various shapes and sizes can be easily joined without requiring the manufacture of devices corresponding to the shape and size of each resin pipe and each resin member.

Furthermore, with the arrangement above, because the laser welding is performed while the light emission unit simply revolves around the junction, any expensive devices are not required and manufacturing cost is reduced.

The laser bonding method of the present invention is preferably arranged such that the laser light is applied from the light emission unit to the junction through a reflecting mirror which is configured to revolve around the junction in sync with the light emission unit.

The laser light is applied through the intermediary of the reflecting mirror in the arrangement above. It is therefore possible to accurately apply the laser light onto the junction. On this account, the laser welding is further easily achieved as compared to cases where the laser light is directly emitted from the light emission unit onto the junction. Furthermore, it is unnecessary to adjust the radius of revolution of the light emission unit in order to join resin pipes and resin members with various shapes and sizes. It is therefore possible to downsize the device.

The laser bonding method of the present invention is preferably arranged such that the light emission unit revolves around the junction while maintaining an initial posture of the light emission unit or keeping the tilt of the light emission unit relative to the initial posture to fall within the predetermined angle range.

In order to further ensure the joining by laser welding, it is necessary to cause the light emission unit to revolve around the junction plural times. However, if the light emission unit rotates on its axis while the light emission unit revolves around the junction, the optical fiber by which the laser light is supplied to the light emission unit is distorted. The distortion is significant as the angle of the rotation is large, and excessive distortion may cause disconnection.

With the arrangement above, the light emission unit revolves around the junction plural times while the distortion of the optical fiber is prevented or suppressed. As a result, the laser welding of the resin pipe and the resin member is further ensured while the disconnection of the optical fiber of the light emission unit is prevented.

The laser bonding method of the present invention is preferably arranged such that the light emission unit revolves around the junction while revolution speed of the light emission unit is controlled.

According to the arrangement above, it is possible to control the time of application of the laser light onto the junction by controlling the revolution speed of the light emission unit. It is therefore possible to maintain the welding temperature to be constant and suppress variations in joining strength at the junction, even if the resin member is polygonal in cross section.

A laser bonding device of the present invention for joining a resin pipe with a resin member, which joins an inner circumferential surface of a member made of a resin material transmitting laser light with an outer circumferential surface of a pipe made of a resin material absorbing laser light, comprises: a base; a setting portion which is provided on a front side of the base and to which the pipe and the member are fixed; a light emission unit which is configured to apply the laser light to a junction between the pipe and the member that are fixed to the setting portion; and a driving device which is attached to a back side of the base and includes a pulley or a gear to which the light emission unit is attached, the light emission unit revolving around the junction as the pulley or the gear rotates.

Preferably, the laser bonding device of the present invention further includes a reflecting mirror which is configured to revolve around the junction in sync with the light emission unit and reflect the laser light to the junction.

In addition to the above, the laser bonding device of the present invention is preferably arranged such that the light emission unit revolves around the junction while maintaining an initial posture or keeping the tilt of the light emission unit relative to the initial posture to fall within a predetermined angle range.

In addition to the above, the laser bonding device of the present invention is preferably arranged such that the driving device includes a motor by which revolution speed of the light emission unit is controlled.

Advantageous Effects of Invention

The present invention provides a laser bonding method and a laser bonding device for joining a resin pipe with a resin member by applying laser light, by which resin pipes and resin members with various shapes and sizes can be easily joined.

DESCRIPTION OF EMBODIMENTS

The following will describe a preferred embodiment of the present invention with reference to figures.

In the present embodiment, a laser bonding device 1 is a laser bonding device configured to join the inner circumferential surface of a resin member 31 made of a resin material transmitting laser light with the outer circumferential surface of a resin pipe 30 made of a resin material absorbing laser light.

Figure 1:
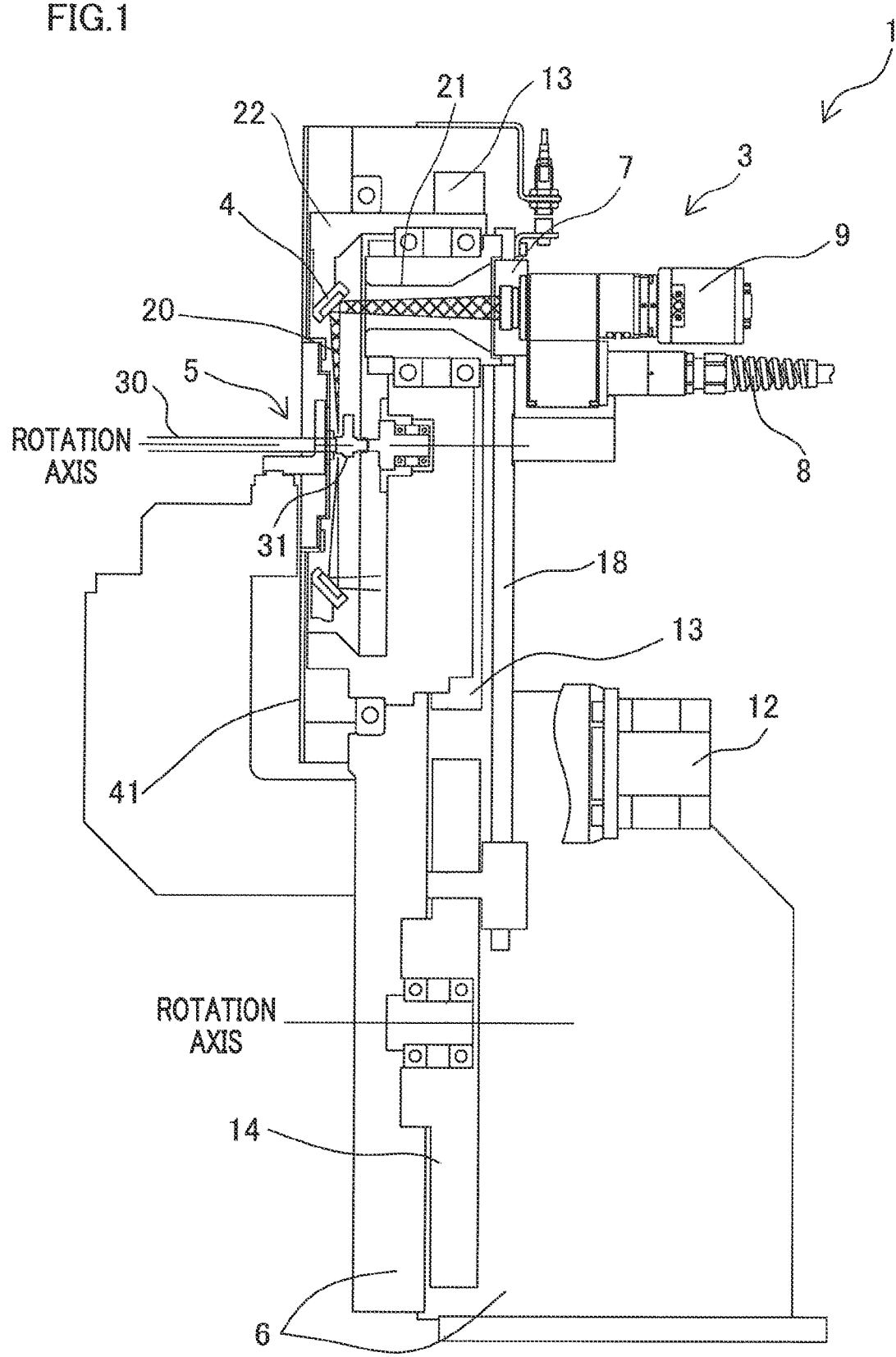
FIG. 1 is a cross section showing the structure of a laser bonding device of an embodiment.
Figure 3:
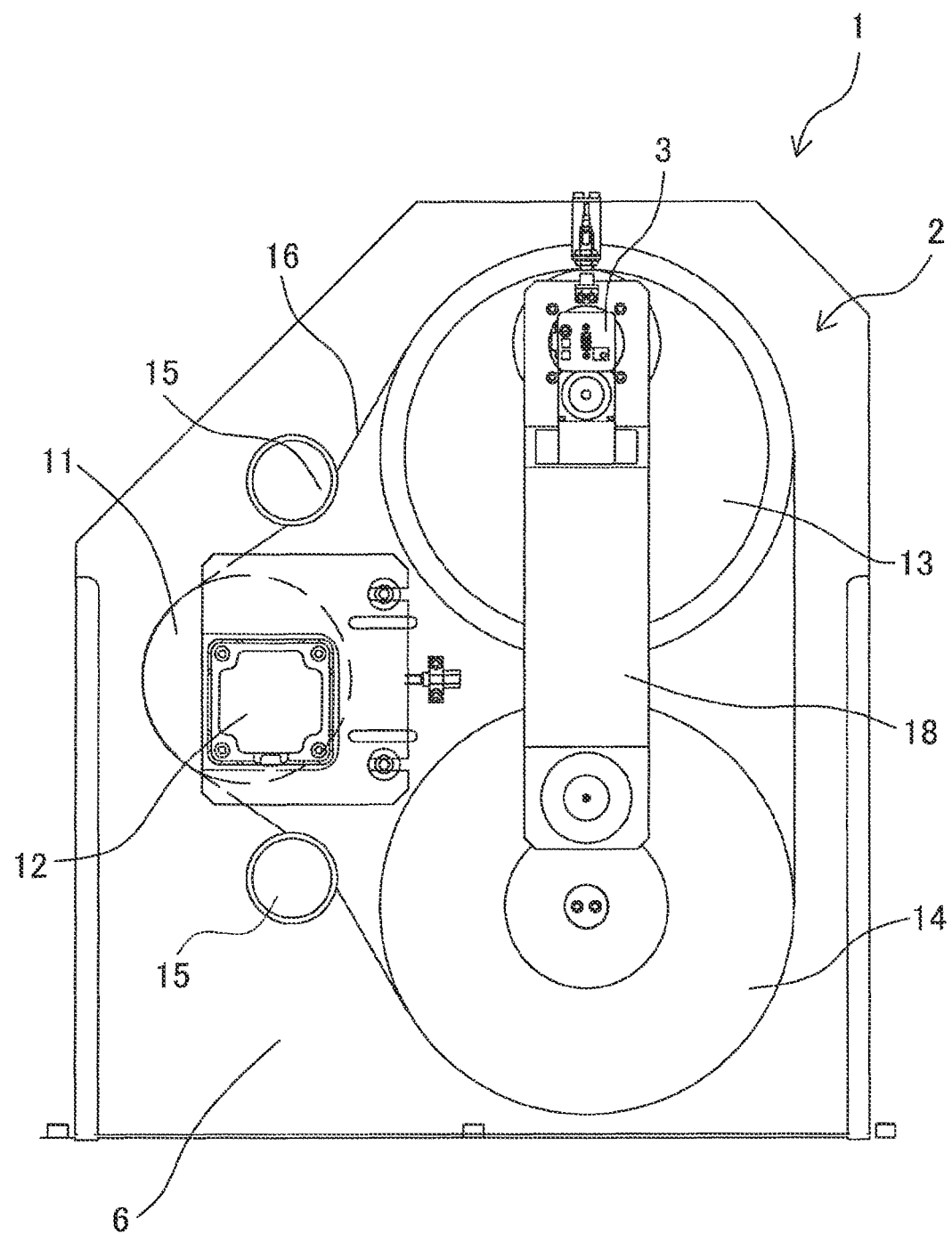
FIG. 3 shows a driving device of the laser bonding device of the embodiment.

As shown in FIG. 1 and FIG. 3, the laser bonding device 1 includes a driving device 2, a light emission unit 3, a reflecting mirror 4, a setting portion 5, and a base 6. The laser bonding device 1 is a device that joins the resin pipe 30 with the resin member 31 by applying laser light 20 to a junction 32 between the resin pipe 30 and the resin member 31 that are fixed to the setting portion 5. In the present embodiment, the junction 32 is a part where the outer circumferential surface of the resin pipe 30 overlaps the inner circumferential surface of the resin member 31 as the resin pipe 30 is inserted into the resin member 31. In the direction of the revolution axis of the light emission unit 3, the laser bonding device 1 of the present embodiment has two sides. One side is a side where the resin pipe 30 and the resin member 31 are provided, whereas the other side is a side where these components are not provided. Hereinafter, the one side will be referred to as a front side whereas the other side will be referred to as a back side.

(Driving Device 2)

The driving device 2 is a device used for revolving the light emission unit 3 and is attached to (provided on) the back side of the base 6 as shown in FIG. 3. This driving device 2 includes a driving pulley 11, a motor 12, two timing pulleys 13 and 14, two idler pulleys 15, and a timing belt 16 wound onto the pulleys. The idler pulleys 15 are provided between the timing pulley 13 and the driving pulley 11 and between the timing pulley 14 and the driving pulley 11, respectively.

The driving pulley 11 is rotated by the driving force generated by the motor 12, and the two timing pulleys 13 and 14 are rotated by this driving force transmitted by the timing belt 16. The timing pulleys 13 and 14 are connected with each other by a connecting body 18. Each of the timing pulleys 13 and 14 is connected to the connecting body 18 at an eccentric position, and the eccentric positions are identically distanced from the centers of the respective timing pulleys. The timing pulleys 13 and 14 and the connecting body 18 are connected through bearings. When each pulley is rotating, the connecting body 18 rotates always in a horizontal posture, i.e., rotates while maintaining the horizontal posture (see FIG. 4). This suppresses a difference in rotation speed between the timing pulleys 13 and 14, and therefore facilitates the synchronization of the rotation.

The timing pulleys 13 and 14 may not be connected by the connecting body 18.

The motor 12 is preferably a motor by which revolution speed is controllable. As the motor 12 controls the revolution speed of the light emission unit 3 through the pulleys so as to control the time of application of the laser light 20 onto the junction 32, the welding temperature is maintained to be constant and variations in joining strength are suppressed, even if the resin member 31 is polygonal in cross section. The motor 12 may not be a motor by which revolution speed is controllable. In such a case, however, the resin member 31 to be joined is preferably circular in cross section.

(Light Emission Unit 3)

As shown in FIG. 1, the light emission unit 3 includes an illumination ring 7 configured to emit the laser light 20, an optical fiber 8 connected to a power source, and a monitor camera 9 configured to take an image of a part to which the emitted laser light 20 is applied. The light emission unit 3 is also attached to the eccentric position of the timing pulley 13, to which the connecting body 18 is fixed through the bearing. The light emission unit 3 revolves around the junction 32 in sync with the rotation of the timing pulley 13.

Figure 4:
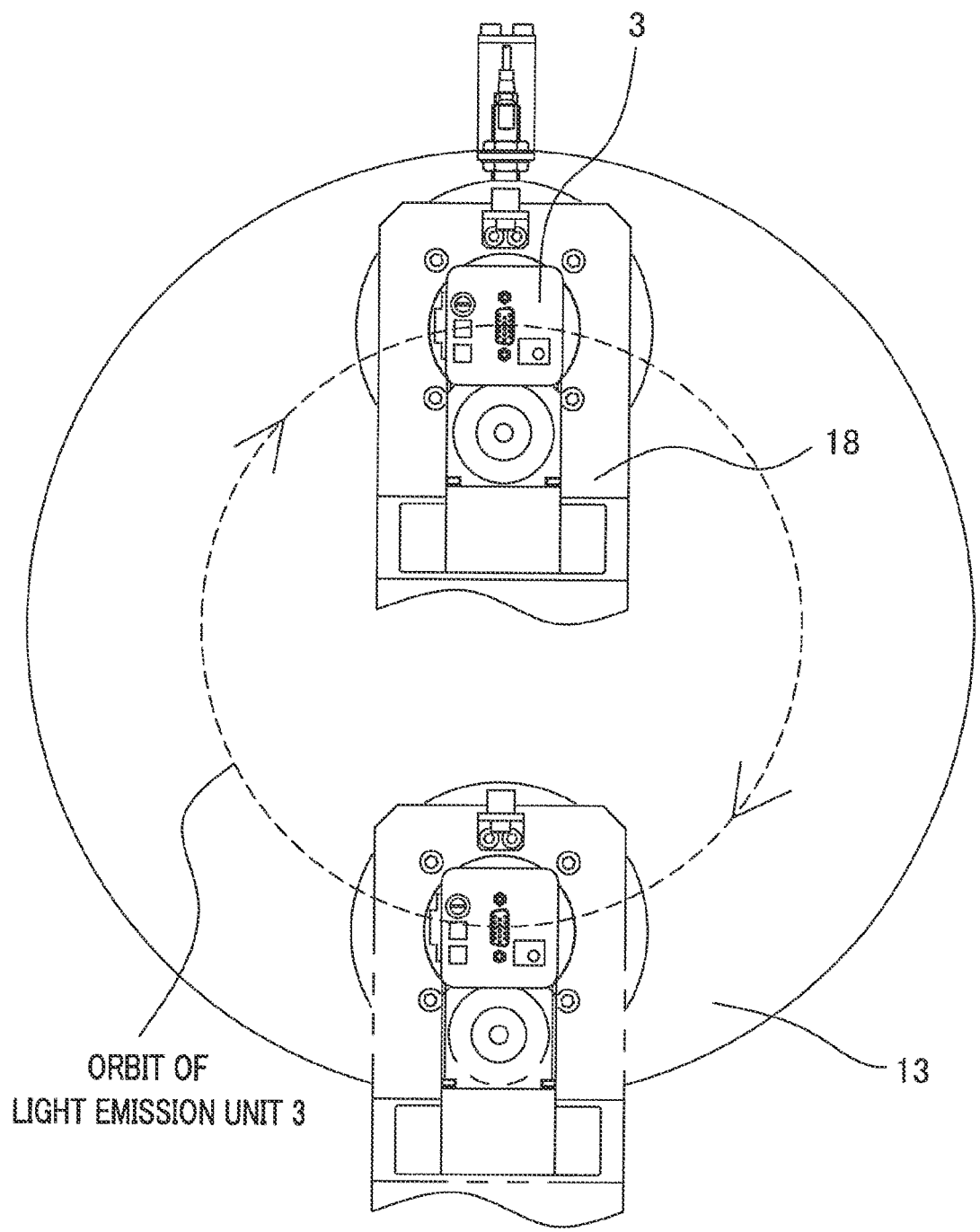
FIG. 4 shows the revolution of a light emission unit of the embodiment.

As shown in FIG. 1, the light emission unit 3 is fixed to the timing pulley 13 through a bearing. Furthermore, the light emission unit 3 is fixed to the connecting body 18 that revolves while maintaining its posture. On this account, as shown in FIG. 4, when the timing pulley 13 rotates, the light emission unit 3 revolves around the junction 32 while maintaining the initial posture. With this arrangement, even when the light emission unit 3 is driven plural times by the driving device 2, the light emission unit 3 revolves around the junction 32 always in the horizontal posture. This prevents the optical fiber 8 from being distorted, and hence the disconnection of the optical fiber 8 is avoided.

In the present embodiment, the light emission unit 3 revolves around the junction 32 while always maintaining the horizontal posture, no matter in which part of the orbit of the light emission unit 3 the light emission unit 3 is located. In this regard, if the initial posture of the light emission unit 3 is tilted by a predetermined angle relative to the horizontal direction, the light emission unit 3 revolves around the junction 32 while always keeping the tilt relative to the horizontal direction at the predetermined angle, no matter in which part of the orbit the light emission unit 3 is located. In any case, the light emission unit 3 revolves around the junction 32 while maintaining the initial posture.

In the timing pulley 13 and the connecting body 18, a passing hole 21 through which the laser light 20 passes is formed in the axial direction to correspond to the location where the light emission unit 3 is provided.

(Reflecting Mirror 4)

The reflecting mirror 4 is a part that reflects the laser light 20 emitted from the light emission unit 3. As shown in FIG. 1, the reflecting mirror 4 is attached to a leading end of an arm 22 that extends from the timing pulley 13 toward the front side in the revolution axis direction. When viewed from the rotational center of the timing pulley 13, the reflecting mirror 4 is provided at the eccentric position where the light emission unit 3 is attached. With this arrangement, the light emission unit 3 and the reflecting mirror 4 revolve around the junction 32 while being always at the same eccentric position when viewed from the rotational center of the timing pulley 13. In other words, the light emission unit 3 and the reflecting mirror 4 revolve around the junction 32 in sync with each other.

Figure 2:
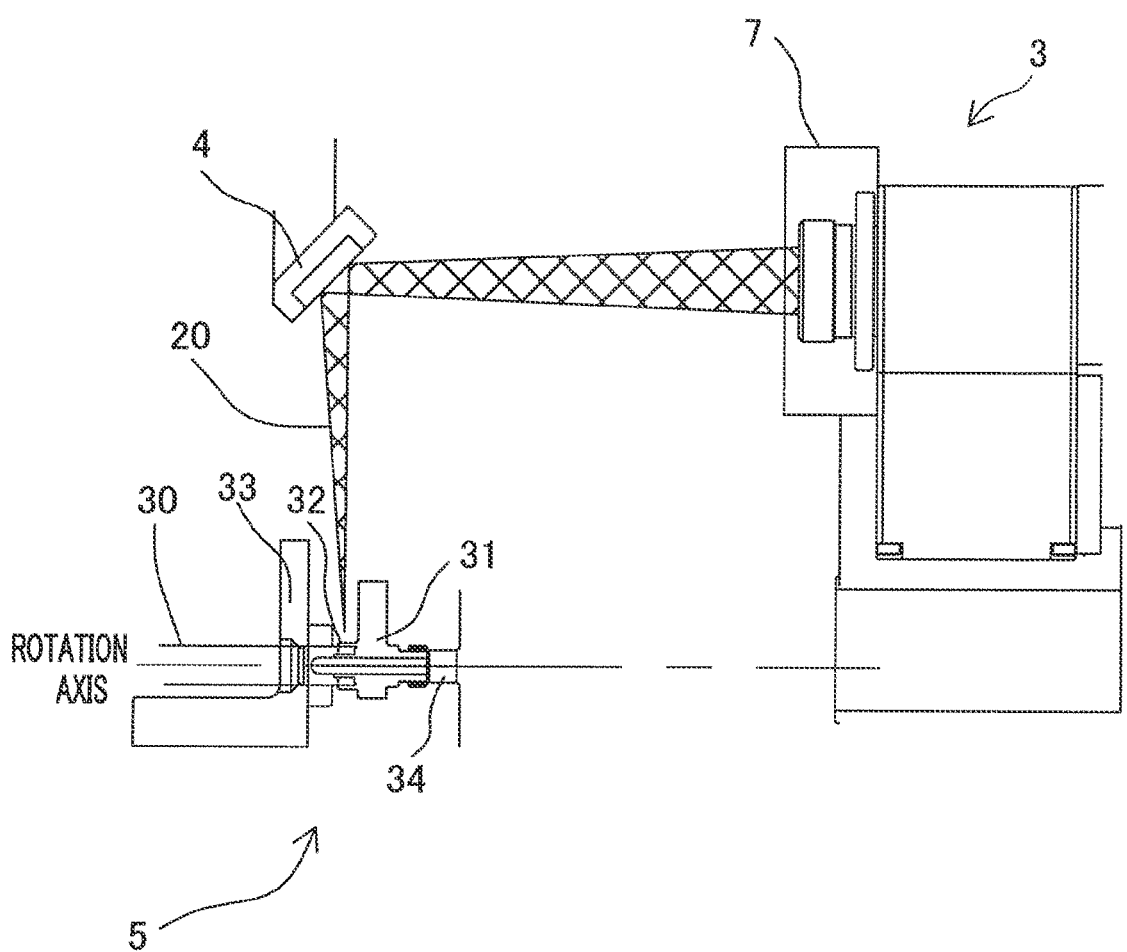
FIG. 2 is an enlarged view of a laser applying part of the laser bonding device of the embodiment.

As shown in FIG. 2, the reflecting mirror 4 is tilted so that the laser light 20 is reflected on the reflecting mirror 4 and hits the junction 32. Because the reflecting mirror 4 moves together with the arm 22 extending from the timing pulley 13, the reflecting mirror 4 revolves around the junction 32 while the reflecting surface of the reflecting mirror 4 is always oriented toward the rotation center.

The number of the reflecting mirrors 4 may be two or more, but is preferably one. When the number of the reflecting mirrors 4 is one, as compared to cases where the number of the reflecting mirrors 4 is two or more, the strength of the laser light 20 applied to the junction 32 is high, the alignment of the optical axis of the laser light 20 can be easily done, and cost reduction is achieved.

When the number of the reflecting mirrors 4 is two or more, the laser light 20 reflected on the two or more reflecting mirrors is applied to the junction.

(Setting Portion 5)

The setting portion 5 is a portion where the resin pipe 30 and the resin member 31 are fixed, and is provided on the revolution axis of the light emission unit 3 and the reflecting mirror 4 and on the front side of the base 6, as shown in FIG. 1. As shown in FIG. 2, the setting portion 5 includes a chuck 33 that fixes the resin pipe 30 and an alignment gauge 34 by which the central position of the junction 32 between the resin pipe 30 and the resin member 31 is aligned with the revolution axis of the light emission unit 3. The chuck 33 is structured to be able to pressurize the resin pipe 30 in a direction in which the resin pipe 30 is inserted into the resin member 31 (i.e., rightward in FIG. 2).

The setting portion 5 may have a sensor function to detect whether the resin pipe 30 and the resin member 31 are provided at the setting portion 5. In this case, for example, the light emission unit 3 is not allowed to emit the laser light 20 until the sensor function detects that the resin pipe 30 and the resin member 31 are provided at the setting portion 5.

In the present embodiment, the laser bonding device 1 includes a cover 41 that covers the front side and the left and right sides of the laser bonding device 1, for the purpose of safety.

The following will describe a laser bonding method of joining the resin pipe 30 with the resin member 31.

To begin with, the resin pipe 30 and the resin member 31 are provided at the setting portion 5 and the resin pipe 30 is fixed by the chuck 33. In so doing, the resin pipe 30 and the resin member 31 are provided so that the outer circumferential surface of the resin pipe 30 overlaps the inner circumferential surface of the resin member 31. The part where the outer circumferential surface of the resin pipe 30 overlaps the inner circumferential surface of the resin member 31 is the junction 32. The center of the junction 32 is aligned with the revolution axis of the light emission unit 3 by the alignment gauge 34. When it is determined based on an image taken by the monitor camera 9 provided in the light emission unit 3 that a part to which the laser light 20 is applied is deviated from the junction 32, the position and angle of the light emission unit 3 and the angle of the reflecting mirror 4 are adjusted. Because the laser light 20 is exactly applied to the junction 32 as a result of the adjustment, the resin pipe 30 and the resin member 31 are reliably joined with each other.

Subsequently, laser light is applied to the junction 32 by the light emission unit 3. The timing pulleys 13 and 14 rotate in accordance with the rotation of the driving pulley 11 driven by the motor 12. In sync with this rotation, the light emission unit 3 revolves. The first half revolution corresponds to a step of increase in rotation speed of each pulley. No laser light 20 is emitted in this step. After the half revolution at which the revolution speed is maximized, the emission of the laser light 20 from the light emission unit 3 starts. The emitted laser light 20 is reflected on the reflecting mirror 4 and hits the junction 32. After the start of the emission of the laser light 20, the light emission unit 3 and the reflecting mirror 4 revolve around the junction 32 plural times. For this reason, the application of the laser light 20 onto the junction 32 is performed plural times. This further ensures the joining of the resin pipe 30 with the resin member 31. Thereafter, the emission of the laser light 20 is stopped, and the rotation of the pulleys is stopped after a deceleration step that corresponds to a half revolution. As the laser light 20 is emitted while the light emission unit 3 revolves around the junction 32 plural times, the joining of the resin pipe 30 with the resin member 31 is further reliably achieved. The number of revolutions of the light emission unit 3 and the reflecting mirror 4 is determined in accordance with the shape, size, material, etc. of each of the resin pipe 30 and the resin member 31 to be joined.

As shown in FIG. 4, the light emission unit 3 fixed to the timing pulley 13 through the bearing revolves around the junction 32 while maintaining the initial posture. With this arrangement, even when the light emission unit 3 revolves around the junction 32 plural times, the light emission unit 3 revolves around the junction 32 always in the horizontal posture. This prevents the optical fiber 8 from being distorted, and hence the disconnection of the optical fiber 8 is avoided.

In the laser bonding method of the present embodiment, the laser light 20 is applied while the light emission unit 3 revolves around the junction 32 plural times. Alternatively, the light emission unit 3 may revolve only once in consideration of the material of the resin pipe 30 and the resin member 31 and the strength of the laser light 20.

When the resin member 31 is polygonal in cross section, the motor 12 that causes the light emission unit 3 to revolve through the pulleys is preferably a motor that controls the revolution speed.

When the resin member 31 is circular in cross section, the light emission unit 3 is arranged to revolve around the junction 32 at constant revolution speed. With this arrangement, the time of application of the laser light 20 onto the entire circumference of the junction 32 is uniform and the welding temperature is maintained to be uniform, with the result that the joining strength of the junction 32 is maintained to be uniform over the entire circumference. Meanwhile, when the resin member 31 is polygonal in cross section, the time of application of the laser light 20 onto the entire circumference of the junction 32 is different between a portion at around each apex of the polygon and a portion on each side, provided that the revolution speed is constant. For this reason, the joining strength over the entire circumference of the junction 32 is different between portions.

Under this circumstance, when the resin member 31 is polygonal in cross section, the motor 12 that controls the revolution speed of the light emission unit 3 is employed. With this arrangement, as the revolution speed is decreased at around an apex of the polygon and the revolution speed is increased on a side, the time of application of the laser light 20 onto the entire circumference of the junction 32 is arranged to be uniform and the welding temperature is maintained to be uniform, with the result that variations in joining strength are avoided.

OTHER EMBODIMENTS

Figure 5:
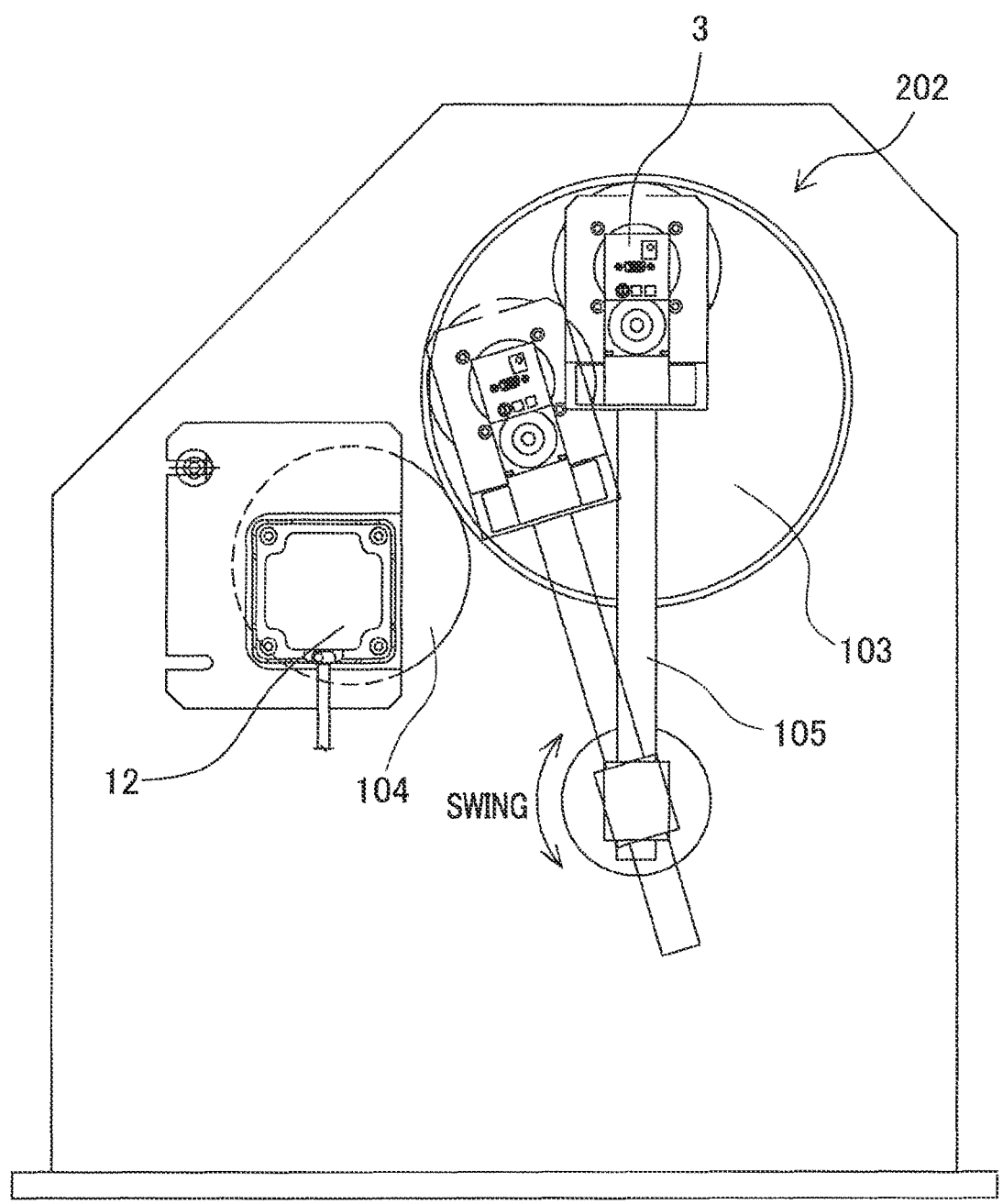
FIG. 5 shows a driving device of a laser bonding device of another embodiment.

The driving device 2 of the embodiment above causes the light emission unit 3 to revolve by rotating the timing pulley 13 through the timing belt 16. Alternatively, a driving device may cause the light emission unit 3 to revolve by using gears. For example, as shown in FIG. 5, a driving device 202 includes a motor 12, gears 103 and 104, and a spline shaft 105. In this arrangement, the gear 104 is rotated by the driving force generated by the motor 12, and the gear 103 meshed with the gear 104 is also rotated. As a result, the light emission unit 3 fixed to an eccentric position of the gear 103 revolves around the junction 32. At this stage, the light emission unit 3 is swung by the spline shaft 105, and the light emission unit 3 revolves around the junction 32 while keeping the tilt of the light emission unit 3 relative to the initial posture to fall within a predetermined angle range. This suppresses the optical fiber 8 from being distorted, and hence the disconnection of the optical fiber 8 is avoided.

In regard to the above, the tilt of the light emission unit 3 relative to the initial posture, which falls within the predetermined angle range, is 60 degrees or less, preferably 45 degrees or less, and more preferably 30 degrees or less. With this arrangement, even when the light emission unit 3 revolves around the junction 32, the distortion of the optical fiber 8 is sufficiently suppressed, and the disconnection is avoided.

In the embodiment above, the sentence "the light emission unit 3 revolves around the junction 32 while the tilt of the light emission unit 3 relative to the initial posture falls within a predetermined angle range" indicates that, no matter in which part of the orbit the light emission unit 3 is located, the light emission unit 3 revolves around the junction 32 while keeping the tilt relative to the initial posture, i.e., an acute angle relative to the initial posture, to fall within the predetermined angle range. With this arrangement, even when the light emission unit 3 revolves around the junction 32, the distortion of the optical fiber 8 is sufficiently suppressed, and the disconnection is avoided.

According to the embodiment above, the laser bonding method of the embodiment is a laser bonding method of joining the inner circumferential surface of the resin member 31 made of a resin material transmitting the laser light 20 with the outer circumferential surface of the resin pipe 30 made of a resin material absorbing the laser light 20, and the laser bonding method is arranged such that the resin pipe 30 and the resin member 31 are fixed to the setting portion 5 provided on the front side of the base 6, and the timing pulley 13 or the gear 103 which is attached to the back side of the base 6 and is provided with the light emission unit 3 configured to emit the laser light 20 is rotated, with the result that the laser light 20 is applied to the junction 32 while the light emission unit 3 revolves around the junction 32 where the resin pipe 30 and the resin member 31 fixed to the setting portion 5 overlap each other. Consequently, the entire outer circumferential surface of the resin pipe 30 is welded and joined with the entire inner circumferential surface of the resin member 31.

The shape and size of each of the resin pipe 30 and the resin member 31 to be joined are determined in accordance with the radius of revolution of the light emission unit 3 emitting the laser light 20. According to the arrangement above, resin pipes and resin members with various shapes and sizes can be easily joined without requiring the manufacture of devices corresponding to the shape and size of each resin pipe 30 and each resin member 31.

Furthermore, because the laser welding is performed while the light emission unit 3 simply revolves around the junction 32, any expensive devices are not required and manufacturing cost is reduced.

According to the laser bonding method of the embodiment above, the laser light 20 is emitted from the light emission unit 3 onto the junction 32 through the intermediary of the reflecting mirror 4 that revolves around the junction 32 in sync with the light emission unit 3.

The laser light 20 is applied through the intermediary of the reflecting mirror 4 in the arrangement above. It is therefore possible to accurately apply the laser light 20 onto the junction 32. On this account, the laser welding is further easily achieved as compared to cases where the laser light 20 is directly emitted from the light emission unit 3 onto the junction 32. Furthermore, it is unnecessary to adjust the radius of revolution of the light emission unit 3 in order to join resin pipes and resin members with various shapes and sizes. It is therefore possible to downsize the device.

According to the laser bonding method of the present embodiment, the light emission unit 3 is arranged to revolve around the junction 32 while maintaining the initial posture of the light emission unit 3 or keeping the tilt of the light emission unit 3 relative to the initial posture to fall within the predetermined angle range.

In order to further ensure the joining by laser welding, it is necessary to cause the light emission unit 3 to revolve around the junction 32 plural times. However, if the light emission unit 3 rotates on its axis while the light emission unit 3 revolves around the junction 32, the optical fiber 8 by which the laser light 20 is supplied to the light emission unit 3 is distorted. The distortion is significant as the angle of the rotation is large, and excessive distortion may cause disconnection.

With the arrangement above, the light emission unit 3 revolves around the junction 32 plural times while the distortion of the optical fiber 8 is prevented or suppressed. As a result, the laser welding of the resin pipe 30 and the resin member 31 is further ensured while the disconnection of the optical fiber 8 of the light emission unit 3 is prevented.

According to the laser bonding method of the present embodiment, the light emission unit 3 is arranged to revolve around the junction 32 while the revolution speed of the light emission unit 3 is controlled.

With this arrangement, as the motor 12 controls the revolution speed of the light emission unit 3 so as to control the time of application of the laser light 20 onto the junction 32, the welding temperature is maintained to be constant and variations in joining strength are suppressed, even if the resin member 31 is polygonal in cross section.

The laser bonding device 1 of the present embodiment is a laser bonding device 1 configured to join the inner circumferential surface of the resin member 31 made of a resin material transmitting the laser light with the outer circumferential surface of the resin pipe 30 made of a resin material absorbing the laser light, the laser bonding device 1 includes: the base 6; the setting portion 5 provided on the front side of the base 6 and fixes the resin pipe 30 and the resin member 31; the light emission unit 3 configured to emit the laser light 20 onto the junction 32 while revolving around the junction 32 where the resin pipe 30 and the resin member 31 fixed to the setting portion 5 overlap each other; and the driving device 2 including the timing pulley 13 or the gear 103 that is attached to the back side of the base 6 and to which the light emission unit 3 is attached, and the light emission unit 3 revolves around the junction 32 as the timing pulley 13 or the gear 103 rotates.

The laser bonding device 1 of the present embodiment includes the reflecting mirror 4 which is arranged to revolve around the junction 32 in sync with the light emission unit 3 and reflects the laser light 20 to the junction 32.

The light emission unit 3 of the present embodiment revolves around the junction 32 while maintaining the initial posture or keeping the tilt of the light emission unit 3 relative to the initial posture to fall within a predetermined angle range.

The driving device 2 of the present embodiment includes the motor 12 that controls the revolution speed of the light emission unit 3.

A preferred embodiment of the present invention has been described. It should be noted that the present invention is not limited to the above-described embodiment, and various changes, substitutions, and alterations can be made herein without departing from the spirit and scope of the invention as defined by the appended claims.

For example, the laser bonding device 1 may include a monitor configured to display images taken by the monitor camera 9. The driving device 2 may not include the idler pulley 15. The driving device 2 may be a robotic arm or a cylinder, and the light emission unit 3 may be caused to revolve around the junction 32 by the robotic arm or the cylinder.

The timing belt 16 may be a belt of another type such as a V belt or a toothed belt.

The reflecting mirror 4 may not be employed. In this case, at least the part of the light emission unit 3 from which the laser light 20 is emitted is provided on the front side of the driving device 2 to be able to directly apply the laser light 20 to the junction 32.

REFERENCE SIGNS LIST 1 laser bonding device
2 driving device
3 light emission unit
4 reflecting mirror
5 setting portion
6 base
7 illumination ring
8 optical fiber
11 driving pulley
12 motor
13, 14 timing pulley
15 idler pulley
16 timing belt
20 laser light
30 resin pipe
31 resin member
32 junction

The invention claimed is:

1. A laser bonding method of joining an inner circumferential surface of a member made of a resin material transmitting laser light with an outer circumferential surface of a pipe made of a resin material absorbing laser light, the method comprising the steps of:
    fixing the pipe and the member to a setting portion provided on a front side of a base; and
    fusing and joining the entire outer circumferential surface of the pipe with the entire inner circumferential surface of the member by applying the laser light onto a junction between the pipe and the member fixed to the setting portion while causing a light emission unit to revolve around the junction, the light emission unit being configured to emit the laser light and attached to a pulley or a gear, the pulley or the gear being provided on a back side of the base to be separated from the setting portion in an axial direction of the pipe, and the light emission unit revolving around the junction as the pulley or the gear is rotated.

2. The laser bonding method according to claim 1, wherein, the laser light is applied from the light emission unit to the junction through a reflecting mirror which is configured to revolve around the junction in sync with the light emission unit.

3. The laser bonding method according to claim 1, wherein, the light emission unit revolves around the junction while maintaining an initial posture of the light emission unit or keeping the tilt of the light emission unit relative to the initial posture to fall within the predetermined angle range.

4. The laser bonding method according to claim 1, wherein, the light emission unit revolves around the junction while revolution speed of the light emission unit is controlled.

5. A laser bonding device which joins an inner circumferential surface of a member made of a resin material transmitting laser light with an outer circumferential surface of a pipe made of a resin material absorbing laser light, the laser bonding device comprising:
    a base;
    a setting portion which is provided on a front side of the base and to which the pipe and the member are fixed;
    a light emission unit which is configured to apply the laser light to a junction between the pipe and the member that are fixed to the setting portion; and
    a driving device which is attached to a back side of the base to be separated from the setting portion in an axial direction of the pipe and includes a pulley or a gear to which the light emission unit is attached,
    the light emission unit revolving around the junction as the pulley or the gear rotates.

6. The laser bonding device according to claim 5, further comprising a reflecting mirror which is configured to revolve around the junction in sync with the light emission unit and reflect the laser light to the junction.

7. The laser bonding device according to claim 5, wherein, the light emission unit revolves around the junction while maintaining an initial posture or keeping the tilt of the light emission unit relative to the initial posture to fall within a predetermined angle range.

8. The laser bonding device according to claim 5, wherein, the driving device includes a motor by which revolution speed of the light emission unit is controlled.

* * * * *